(12) United States Patent
Haniu et al.

(10) Patent No.: US 6,557,656 B2
(45) Date of Patent: May 6, 2003

(54) DRIVING SYSTEM AND VEHICLE

(75) Inventors: Tomoyuki Haniu, Hitachi (JP); Ryoso Masaki, Hitachi (JP); Masahiko Amano, Hitachiohta (JP); Taizo Miyazaki, Hitachi (JP); Yasuo Morooka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/003,408

(22) Filed: Dec. 6, 2001

(65) Prior Publication Data

US 2002/0036106 A1 Mar. 28, 2002

Related U.S. Application Data

(63) Continuation of application No. 09/486,228, filed as application No. PCT/JP99/04209 on Aug. 4, 1999.

(30) Foreign Application Priority Data

Dec. 1, 1998 (JP) .......................................... 10-341361

(51) Int. Cl.$^7$ ................................................. B60K 1/02
(52) U.S. Cl. .................... 180/65.6; 180/65.7; 180/65.2; 180/65.4
(58) Field of Search ............................. 180/65.2, 65.6, 180/65.7, 65.4

(56) References Cited

U.S. PATENT DOCUMENTS

| | | | | | |
|---|---|---|---|---|---|
| 5,669,842 A | * | 9/1997 | Schmidt | .................... | 475/5 |
| 5,788,006 A | * | 8/1998 | Yamaguchi | ................ | 180/65.2 |
| 5,799,744 A | * | 9/1998 | Yamaguchi et al. | ........ | 180/65.2 |
| 5,823,281 A | * | 10/1998 | Yamaguchi et al. | ........ | 180/65.2 |
| 5,823,282 A | * | 10/1998 | Yamaguchi | ................ | 180/65.2 |
| 5,826,671 A | * | 10/1998 | Nakae et al. | .............. | 180/65.2 |
| 5,934,395 A | * | 8/1999 | Koide et al. | ............... | 180/65.2 |
| 5,935,035 A | * | 8/1999 | Schmidt | .................... | 180/65.2 |
| 5,991,683 A | * | 11/1999 | Takaoka et al. | ............ | 701/102 |
| 6,026,921 A | * | 2/2000 | Aoyama et al. | ........... | 180/65.2 |
| 6,048,289 A | * | 4/2000 | Hattori et al. | ................ | 477/15 |
| 6,083,139 A | * | 7/2000 | Deguchi et al. | .............. | 477/5 |
| 6,131,538 A | * | 10/2000 | Kanai | ............................ | 123/2 |
| 6,135,914 A | * | 10/2000 | Yamaguchi et al. | ........... | 477/3 |
| 6,142,907 A | * | 11/2000 | Minowa et al. | ................ | 477/5 |
| 6,190,282 B1 | * | 2/2001 | Deguchi et al. | .............. | 477/5 |
| 6,209,672 B1 | * | 4/2001 | Severinsky | ................ | 180/65.2 |
| 6,233,508 B1 | * | 5/2001 | Deguchi et al. | .............. | 701/22 |
| 6,387,004 B1 | * | 5/2002 | Parrish | .......................... | 475/5 |
| 2001/0050190 A1 | * | 12/2001 | Takenaka | .................... | 180/65.2 |
| 2002/0036106 A1 | * | 3/2002 | Hanyu et al. | ............... | 108/65.2 |

* cited by examiner

*Primary Examiner*—Brian L. Johnson
*Assistant Examiner*—J. Allen Shriver
(74) *Attorney, Agent, or Firm*—Crowell & Moring LLP

(57) ABSTRACT

In a driving system comprising an engine, a plurality of motor-generators and a plurality of coaxial differential mechanisms, rotating output axes of the plurality of motor-generators are disposed parallel to and opposite to a rotating output axis of the engine. The coaxial differential mechanisms are arranged between the engine and the motors. The coaxial differential mechanisms are disposed so that straight lines passing through rotating axes of at least two of the coaxial differential mechanisms are parallel to each other, and the output power of the engine is transmitted to the coaxial differential mechanisms through gears. It is possible to provide a small sized and high productive driving system.

12 Claims, 13 Drawing Sheets

AXIS A AND AXIS B ARE LOCATED IN SIDE OPPOSITE
TO EACH OTHER WITH RESPECT TO PLANE EV

DRIVING SYSTEM AND VEHICLE

This application is a continuation of application Ser. No. 09/486,228, filed Feb. 24, 2000, which is a 371 of PCT/JP99/04209, filed Aug. 4, 1999.

BACKGROUND OF THE INVENTION

The present invention relates to a driving system composed of a motor and a differential mechanism and a vehicle using the driving system.

As a driving system for improving a fuel efficiency of an engine, there is known a hybrid vehicle which utilizes a driving force of a motor.

Although various kinds of hybrid vehicles such as a series type, a parallel type hybrid vehicles are proposed, there is proposed a series-parallel type hybrid vehicle which uses two motors and a planet gear.

For example, Japanese Patent Application Laid-Open No. 7-135701 discloses a method that a driving force of an engine is input to a planet gear, and a motor controls so as to drive the vehicle by a driving force obtained from an output axis of the planet gear. The method is characterized by that the engine assists the driving force from the motor directly linked to the output axis while part of energy of the engine generates electricity by a generator. Therefore, the engine can be always operated at a high efficiency and high torque range and the method also has a transmission function.

The above-mentioned method can provide a high efficiency engine-electric hybrid vehicle, but has a disadvantage in that the size becomes large because the motor is required as one of the components.

Further, there is another disadvantage in that the productivity is deteriorated because number of the components becomes large.

SUMMARY OF THE INVENTION

An object of the present invention is to provide a small sized and high productive driving system for an engine-electric hybrid vehicle which has a conventional motor-generator as described above.

A driving system in accordance with the present invention comprises an engine; a plurality of motor-generators; and a plurality of coaxial differential mechanisms, wherein rotating output axes of the plurality of motor-generators are disposed parallel to and opposite to a rotating output axis of the engine, and a distance Lf1 projected in an axial direction between an end in a side of the rotating output axis of a first motor-generator having the largest dimension in a direction of the rotating output axis among the plurality of motor-generators and an end in a side of the rotating axis of the engine is smaller than a distance Lfi (i=2, 3, . . . ) projected in the axial direction between an end in a side of the rotating output axis of each of the other motor-generators excluding the first motor-generator and the end in the side of the rotating axis of the engine.

Further, a driving system in accordance with the present invention comprises an engine; a plurality of motor-generators; and a plurality of coaxial differential mechanisms, wherein rotating output axes of the plurality of motor-generators are disposed parallel to and opposite to a rotating output axis of the engine, and a distance Le1 projected in an axial direction between an end in an opposite side of the rotating output axis of a first motor-generator having the largest dimension in a direction of the rotating output axis among the plurality of motor-generators and an end in a side of the rotating axis of the engine is larger than a distance Lei (i=2, 3, . . . ) projected in the axial direction between an end in an opposite side of the rotating output axis of each of the other motor-generators excluding the first motor-generator and the end in the side of the rotating axis of the engine.

Further, a driving system in accordance with the present invention comprises an engine; a plurality of motor-generators; and a plurality of coaxial differential mechanisms, wherein rotating output axes of the plurality of motor-generators are disposed parallel to a rotating output axis of the engine and in a side of a surface distant from the engine, and a distance Lf1 projected in an axial direction between an end in a side of the rotating output axis of a first motor-generator having the largest dimension in a direction of the rotating output axis among the plurality of motor-generators and an end in a side of the rotating axis of the engine is smaller than a distance Lfi (i=2, 3, . . . ) projected in the axial direction between an end in a side of the rotating output axis of each of the other motor-generators excluding a first motor-generator and the end in the side of the rotating axis of the engine.

Further, a driving system in accordance with the present invention comprises an engine; a plurality of motor-generators; and a plurality of coaxial differential mechanisms, wherein rotating output axes of the plurality of motor-generators are disposed parallel to a rotating output axis of the engine and in a side of a surface distant from the engine, and a distance Le1 projected in an axial direction between an end in an opposite side of the rotating output axis of a first motor-generator having the largest dimension in a direction of the rotating output axis among the plurality of motor-generators and an end in a side of the rotating axis of the engine is larger than a distance Lei (i=2, 3, . . . ) projected in the axial direction between an end in an opposite side of the rotating output axis of each of the other motor-generators excluding the first motor-generator and the end in the side of the rotating axis of the engine.

Further, a driving system in accordance with the present invention comprises an engine; a plurality of motor-generators; and a plurality of coaxial differential mechanisms, wherein rotating output axes of the plurality of motor-generators are disposed parallel to a rotating output axis of the engine, and a center of gravity of the motor-generator having the maximum weight is placed at a position lower than a center of gravity of each of the other motor-generators.

Further, a driving system in accordance with the present invention comprises an engine; a plurality of motor-generators; and a plurality of coaxial differential mechanisms, wherein rotating output axes of the plurality of motor-generators are disposed parallel to a rotating output axis of the engine, and a lowermost end of the motor-generator having the maximum volume is placed at a position higher than a center of gravity of each of the other motor-generators.

Further, a driving system in accordance with the present invention comprises an engine; a plurality of motor-generators; and a plurality of coaxial differential mechanisms, wherein the coaxial differential mechanisms are disposed so that straight lines passing through rotating axes of at least two of the coaxial differential mechanisms are parallel to each other.

Further, a driving system in accordance with the present invention comprises an engine; a plurality of coaxial differential mechanisms; and a first and a second motor-generators, wherein the plurality of coaxial differential mechanisms comprise a first coaxial differential mechanism connected to an output axis of the engine, an input and output axis of the first motor-generator and a vehicle driving axis; and a second coaxial differential mechanism connected to the output axis of the engine, an input and output axis of the second motor-generator and a vehicle driving axis, the first motor-generator and the second motor-generator being disposed on a single axis, an axis of the first differential mechanism connected to the input and output axis of the first motor-generator penetrating through an axis of the second differential mechanism connected to the input and output axis of the second motor-generator.

Furthermore, the present invention is a vehicle comprising any one of the driving systems described above.

DESCRIPTION OF THE PREFERRED EMBODIMENTS

Embodiments of the present invention will be described below.

Figure 1:
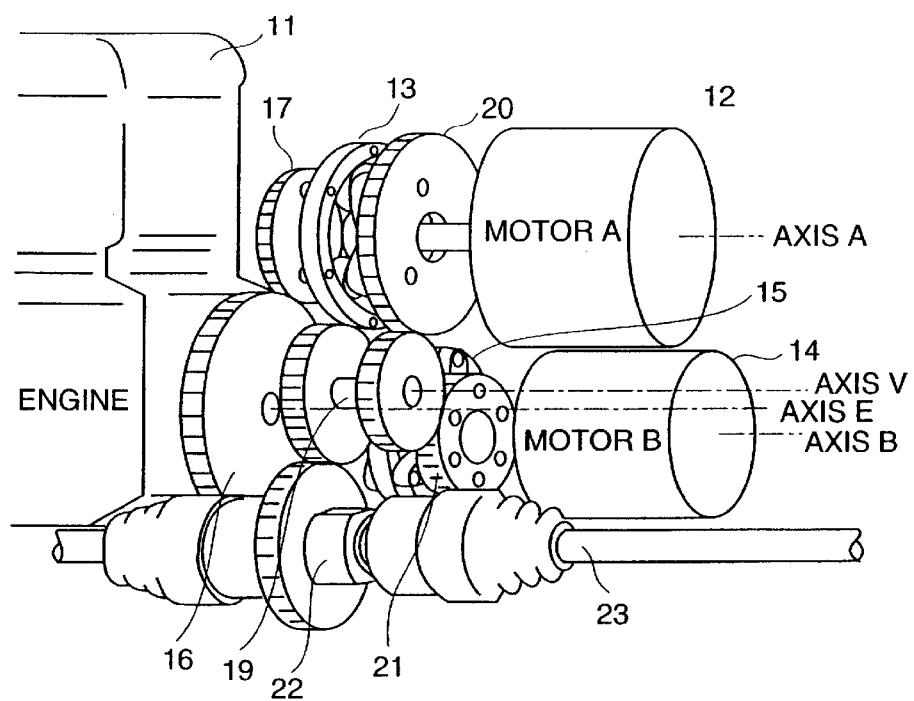
FIG. 1 is a view showing an embodiment of a vehicle in accordance with the present invention.

FIG. 1 shows an embodiment of a vehicle to which a driving system in accordance with the present invention is applied. The embodiment is a hybrid vehicle having an engine and a motor-generator and is suitable for a so-called FF type in which the driving system is mounted in the front portion to drive the front wheels. In the following description, the motor-generator is simply referred as a motor.

In the figure, the reference character 11 is an engine, the reference character 12 is a motor A, the reference character 13 is a planet gear A, the reference character 14 is a motor B, and the reference character 15 is a planet gear B. Here, A and B are characters for distinguishing the motors and the gears. The motor A 12 and the planet gear A 13 are arranged on a single axis, and the motor B 14 and the gear B 15 are arranged on a single axis. By arranging each set of motor and gear on the single axis, a torque transmission mechanism can be eliminated and the total efficiency can be improved. There is a problem that a complexly combined gear train is generally bad in the ability to be assembled. However, in a case where a motor and a gear are arranged on a single axis as in the present type, a geared motor composed of a motor and a planet gear in a unit can be purchased and used as a part, and accordingly the productivity can be improved.

The reference character 16 is an engine output axis gear attached to the output axis of the engine, the reference character 17 is an A side input axis gear, and the reference character 18 is a B side input axis gear. However, the B side input axis gear 18 is not shown in the figure because it is behind another part. The A side input axis gear 17 is arranged on the same axis as the rotating axis of the motor A 12 and the planet gear A 13. Hereinafter, the rotating axis of the motor A 12 is referred to as an axis A. Similarly, the B side input axis gear 18 is arranged on the same axis as the rotating axis of the motor B 14 and the planet gear B 15. Hereinafter, the rotating axis of the motor B 14 is referred to as an axis B. Further, the output axis of the engine is referred to as an axis E.

The engine output axis gear 16 is engaged with the A side input axis gear 17 to transmit generated torque of the engine 11 to the rotating axis of the planet gear A 13. Further, the engine output axis gear 16 is engaged with the B side input axis gear 18 which transmits generated torque of the engine 11 to the rotating axis of the planet gear B 15.

The reference character 19 is a transmitting axis, the reference character 20 is an A side output axis gear, and the reference character 21 is a B side output axis gear. The A side output axis gear 20 is arranged on the same axis as the A axis, and the B side output axis gear 21 is arranged on the same axis as the B axis. The planet gear A 13, the planet gear B 15, and the mechanical link state with each of the elements are to be described later.

The reference character 22 is a differential gear which works to distributes power obtained from the transmitting axis 19 to a right hand side wheel and a left hand side wheel. The reference character 23 is a front axle which works to transmit the power distributed the differential gear to the wheel.

In this construction, the mechanical output axes of the plurality of motors and the engine output axis are arranged opposite to each other, and the planet gear is arranged between the engine 11 and the individual motors. Further, since the planet gear axes are arranged parallel to each other, a special gear is not necessary to be used to the engine output axis gear 16 or the A side input axis gear 17, but an economical and high transmitting efficiency flat gear or helical gear or herringbone gear can be used.

Further, it is assumed here that the motor A 12 has a volume larger than that of the motor B 14, and the larger volume motor is disposed at an upper position. This is because a space for installing the front axles 23 is secured in the FF (front engine and front drive) vehicle. In recent years, length of a passenger car is required to be shortened in order to secure cornering performance and to make handling easy, and on the other hand, height of the passenger car is often designed so as to have a sufficient clearance in order to secure livability and to improve visibility. Therefore, in a case where a plurality of motors are used as in the present invention, it is more effective to stack up the motors as shown in the figure than to horizontally arrange the motors. At that time, if the motors having smaller volumes are arranged in a lower portion, the front axle 23 can be installed without increasing the length of the passenger car.

Further, it is also effective for improving stability that the motors having heavy weights are arranged in a lower position.

Figure 2:
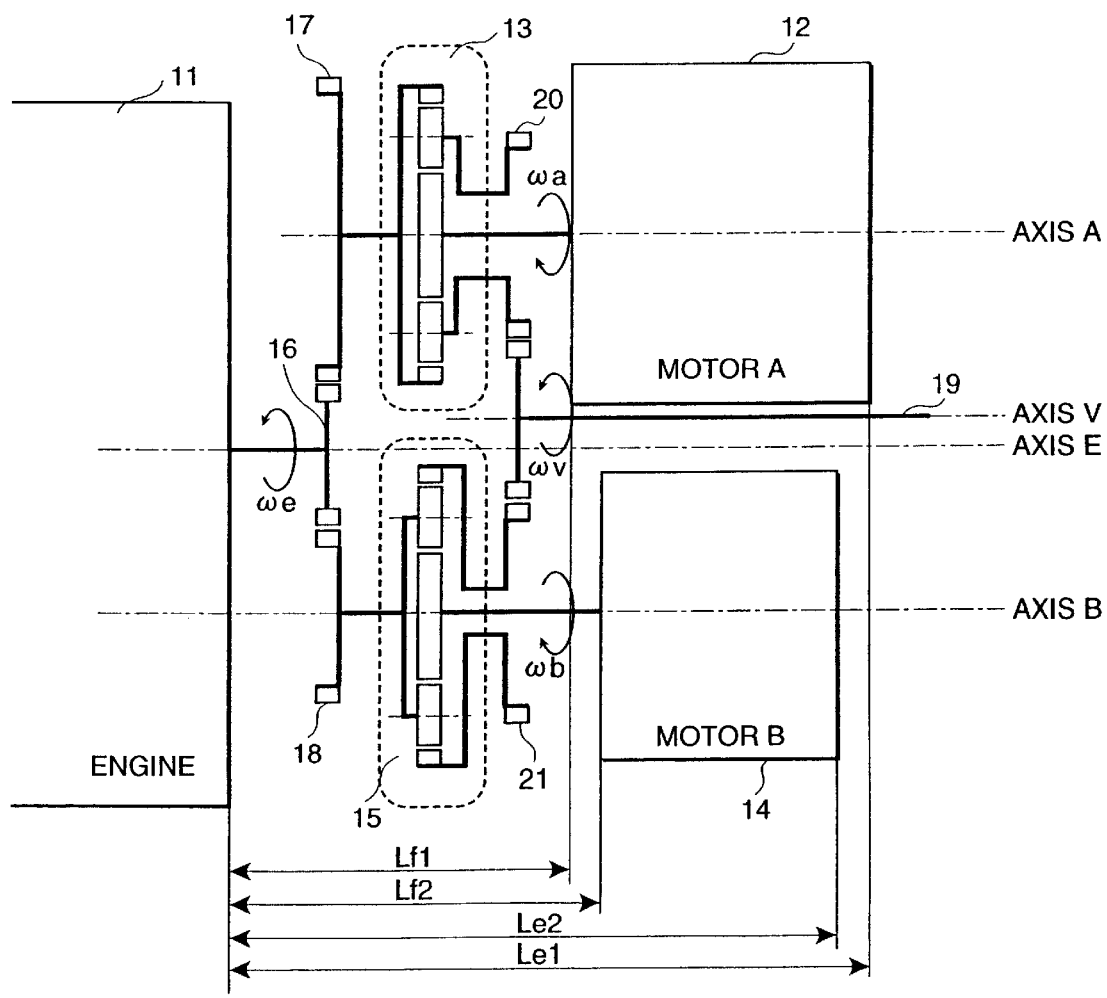
FIG. 2 is a diagram showing the mechanical construction of an embodiment of the driving system.

FIG. 2 is a diagram explaining the mechanism of the driving system shown in FIG. 1. Letting a distance projected in the axial direction between an end in a side of the rotating output axis of the motor A 12 and an end in a side of the rotating axis of the engine be $Lf1$, a distance projected in the axial direction between an end in a side of the rotating output axis of the motor B 14 and the end in the side of the rotating axis of the engine be $Lf2$, a distance projected in an axial direction between an end in an opposite side of the rotating output axis of the motor A 12 and the end in the side of the rotating axis of the engine be $Le1$, and a distance projected in an axial direction between an end in an opposite side of the rotating output axis of the motor B 14 and the end in the side of the rotating axis of the engine be $Le2$, the following relation can be satisfied.

$$Lf1 \leq Lf2 < Le2 \leq Le1 \quad \text{(Equation 1)}$$

By arranging as described above, in the case where a plurality of motors are used as the components, the individual motors can be arranged within the length of the motor A 12, and accordingly the overall system can be made compact. On the contrary, the condition $Lf1 > Lf2$ means that the distance between the end in the engine side of the motor A and the end in the motor A side of the planet gear A is unnecessarily large. Further, forming the stator of the motor A 12 and the stator of the motor B 14 in a unit is effective to reducing the weight because an amount of the material used is not increased. Further, it is also effective to set $Lf1 = Lf2$ because the length of the rotating axis of the motor B is shortened as short as possible to increase rigidity.

Figure 3:
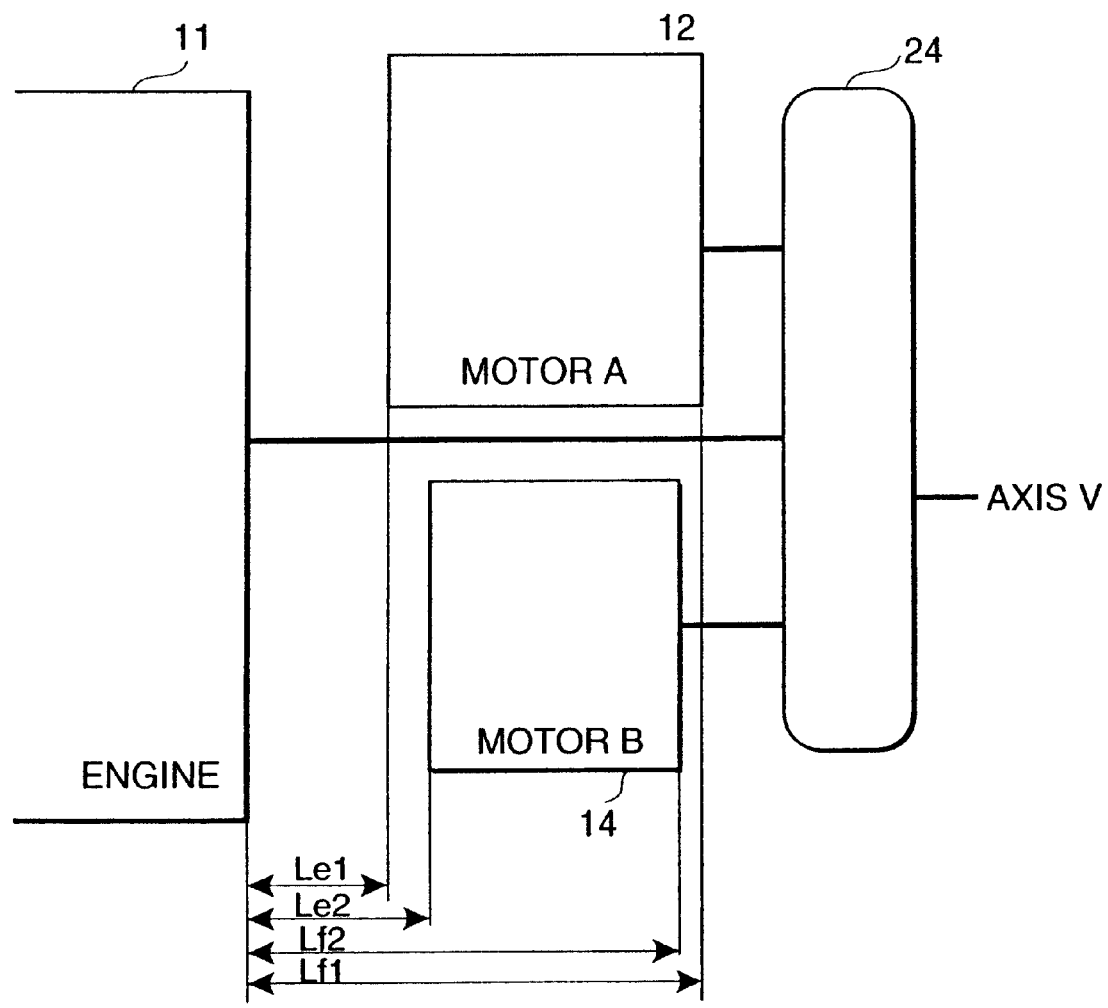
FIG. 3 is a diagram showing the mechanical construction of another embodiment of the driving system.

It is also possible to similarly arrange the engine and the motors so that the rotating axis of the engine and the rotating axes of the motors are directed in the same direction. This embodiment is shown in FIG. 3. In this figure, the reference character 24 is a power transmitting means including the planet gear A 13, the engine output axis gear 16 and the like described above. Letting a distance projected in the axial direction between an end in a side of the rotating output axis of the motor A 12 and an end in a side of the rotating axis of the engine be $Lf1$, a distance projected in the axial direction between an end in a side of the rotating output axis of the motor B 14 and the end in the side of the rotating axis of the engine be $Lf2$, a distance projected in an axial direction between an end in an opposite side of the rotating output axis of the motor A 12 and the end in the side of the rotating axis of the engine be $Le1$, and a distance projected in an axial direction between an end in an opposite side of the rotating output axis of the motor B 14 and the end in the side of the rotating axis of the engine be $Le2$, the following relation can be satisfied.

$$Le1 \leq Le2 < Lf2 \leq Lf1 \quad \text{(Equation 2)}$$

Similarly to the case of FIG. 2, this arrangement is also effective to make the volume of the system small.

Figure 4:
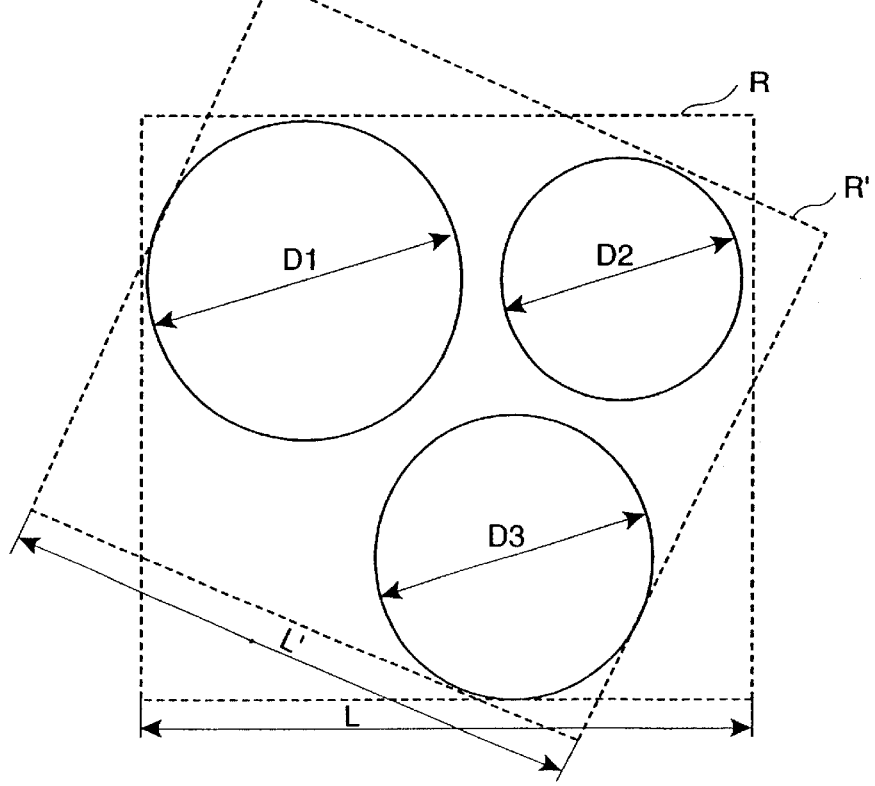
FIG. 4 is a diagram showing an example of configuration of motors.

FIG. 4 shows a motor arrangement in accordance with the present invention on a plane P having the normal direction parallel to the axis of the motor-generator. A shape formed by projecting the motor-generators on the plane P is let be F, and an arbitrary rectangle including the shape F is let be R. Therein, letting a long side of the rectangle be L, and diameters of the motor-generators be $D1, D2, \ldots, Dn$, it is effective for mounting the motor-generators that the following relationship is satisfied.

$$L < D1 + D2 + \ldots + Dn \quad \text{(Equation 3)}$$

In general, as a shape of an object approaches to a sphere, the surface area to the mass is decreased. As a result, by arranging the plurality of motors so as to satisfy the above equation, the amount of material required to for the casing can be decreased compared to, for example, a case of arranging the motors in a row.

Operation in the present embodiment will be described below. Here, the motor A 12 is attached to a sun gear of the planet gear A 13, and the A side input axis gear 17 is attached to a carrier of the planet gear A 13. Further, the carrier of the planet gear A 13 is attached to the A side output axis gear 20. Similarly, the motor B 14 is attached to a sun gear of the planet gear B 15, and the B side input axis gear 18 is attached to a carrier of the planet gear B 15. Further, the carrier of the planet gear B 15 is attached to the B side output axis gear 21.

Figure 5:
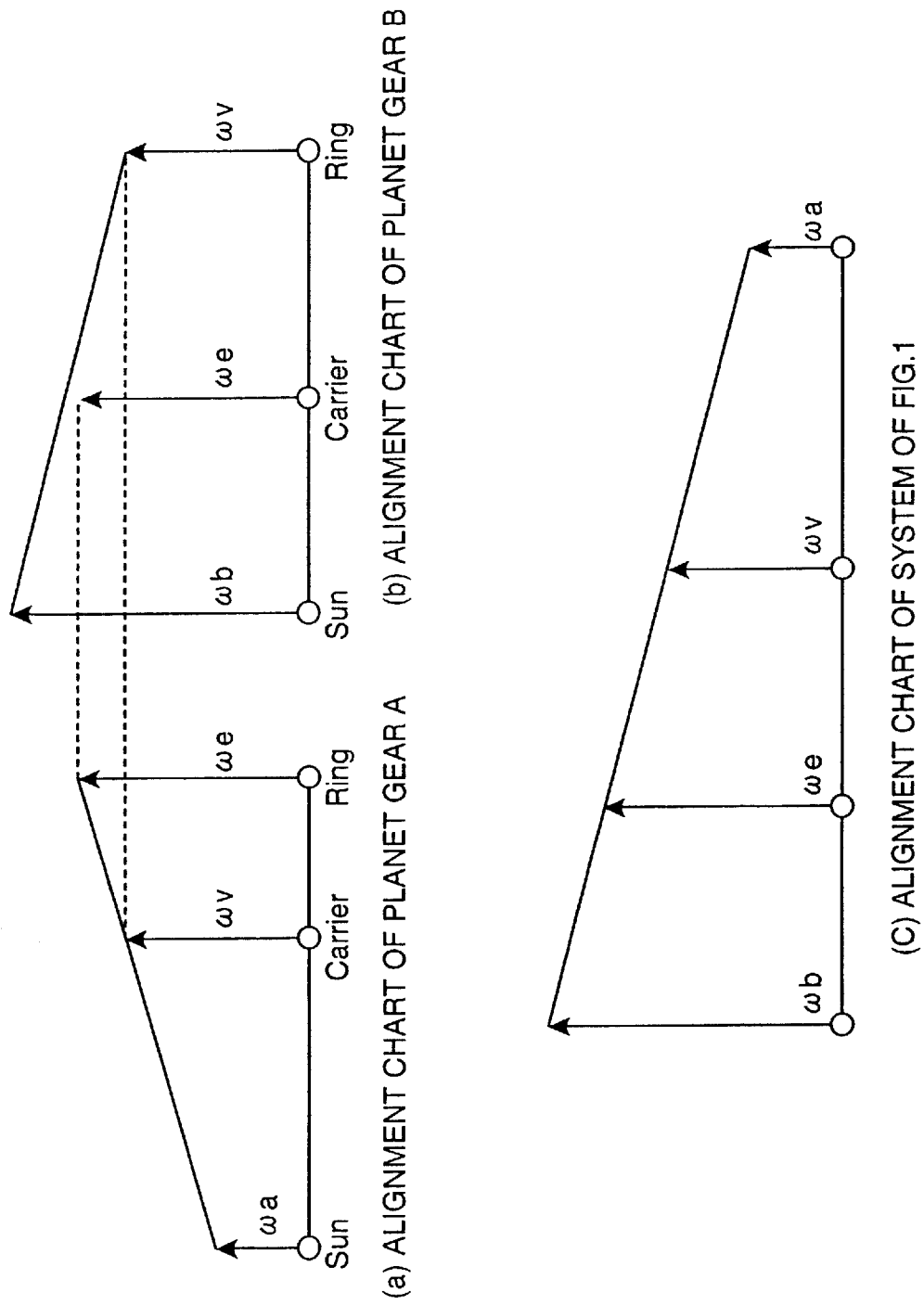
FIG. 5 is alignment charts of the driving system.

FIG. 5 is alignment charts for explaining the operation of the driving system. FIG. 5 (*a*) is an alignment chart of the planet gear A, and FIG. 5 (*b*) is an alignment chart of the planet gear B. Therein, the notation ωe is a rotating speed of the engine 11, the notation ωa is a rotating speed of the motor A 12, the notation ωb is a rotating speed of the motor B 14, and the notation ωv is a rotating speed of the transmitting axis 19. Therein, for the purpose of simplification, the charts are drawn by omitting the gear ratios of the input and output gear to the axis A and the input and output gear to the axis B.

The alignment charts of FIGS. 5 (*a*) and (*b*) are superposed by normalizing the distance between ωv and ωe to form FIG. 5 (*c*). That is, ωe can be freely determined by setting ωa and ωb corresponding to ωv, and accordingly the engine 11 can be operated at the optimum operating point corresponding to a driving condition. The present invention has an advantage in that a small sized and high efficiency driving system can be constructed in a construction having a plurality of motors and a plurality of planet gears and capable of independently setting the rotating speeds and torque of the engine and the transmitting axis.

Figure 6:
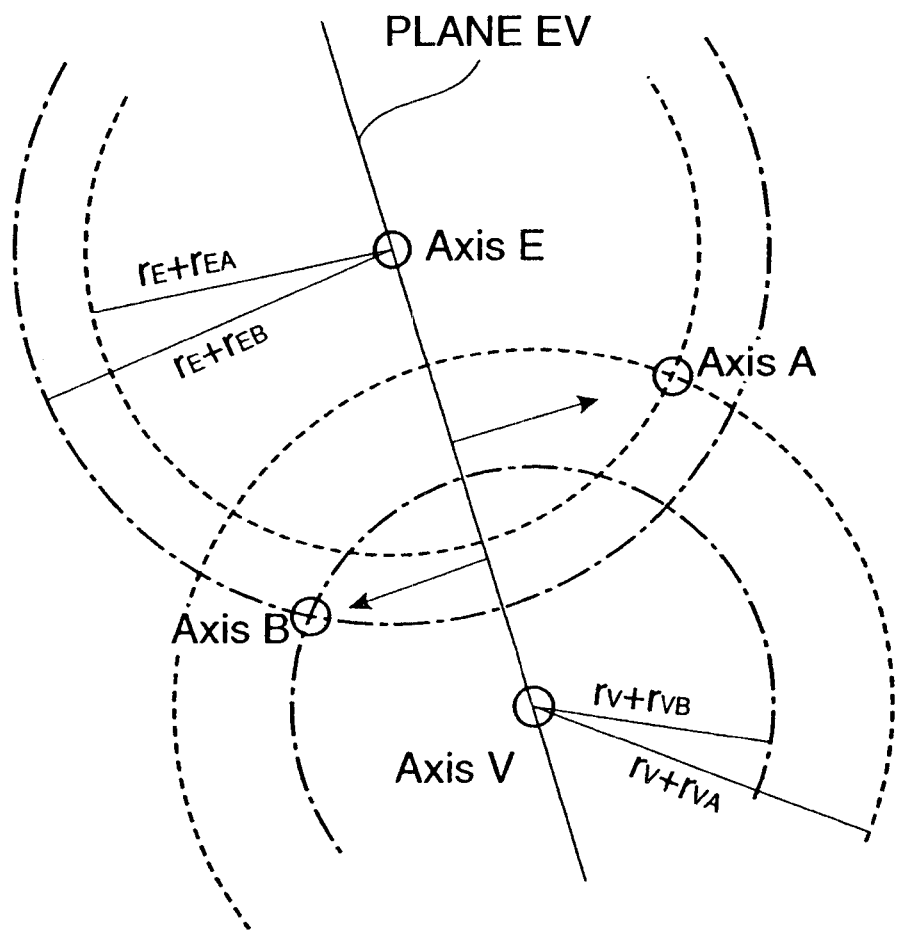
FIG. 6 is a diagram explaining configuration of axes.

FIG. 6 is a diagram explaining configuration of axes A, B, E and V. Therein, the normal vector of the plane of the figure is the same direction as each of the axes. In the figure, the notation rE is a radius of module circle of an engine output axis gear 16, the notation rEA is a radius of module circle of an A side input axis gear 17, the notation rEB is a radius of module circle of a B side input axis gear 18, the notation rV is a radius of module circle of a transmitting gear joined to the transmitting axis 19, the notation rVA is a radius of module circle of an A side output axis gear 20, and the notation rVA is a radius of module circle of a B side input axis gear 21. The transmitting gear joined to the transmitting axis 19 is engaged both with the A side output axis gear 20 and with the B side input axis gear 21.

In this construction, there is an offset between the axis E and the axis V. This is because the radiuses rE, rEA, . . . , rVB can be freely set and the gear ratios can be easily set corresponding to a vehicle performance by eliminating the condition of setting the axis E and the axis V on a single axis. The differential mechanism typical of the planet gear is generally severe in setting condition and difficult to freely set the gear ratios, but employing such a construction moderates the restrictions and make it easy to design a vehicle.

Referring to FIG. 6, the axis A can be positioned on the circle illustrated by a dot line, and the axis B can be positioned on the circle illustrated by a dash-dot line. When the position of the axis E and the axis V are determined, each of the axis A and the axis B has two points capable of being positioned. It is preferable that arranging positions of the axis A and the axis B are selected from the individual two points capable of being positioned so that the axis A and the axis B are positioned in the side opposite to each other with respect to a plane EV including the axis E and the axis V. This is because the distance between the axis A and the axis B becomes smaller in the case where the axis A and the axis B are positioned in the same side with respect to a plane EV than in the case where the axis A and the axis B are positioned in the side opposite to each other. In the case of the present invention in which the motors are arranged parallel to each other, the distance between the axes must be apart by a distance equivalent to the sum of the motor radiuses, and consequently the radiuses rE, rEA, . . . , rVB become larger and as a result the overall volume becomes larger.

Although the embodiment of a mechanism employing planet gears is described here, another differential mechanism, for example, a differential gear may be employed. Further, the same effect can be attained by applying the present embodiment not only to the FF (front engine and front drive) vehicle but also to a vehicle of a type required to make the driving system compact, for example, a type in which the driving system is disposed in the rear portion and the rear wheels are driven. Furthermore, it is effective that the present embodiment is applied to a vehicle of a type placing the driving system in the middle of the vehicle body, that is, a so-called mid-ship layout by making use of the small size of the present system.

Figure 7:
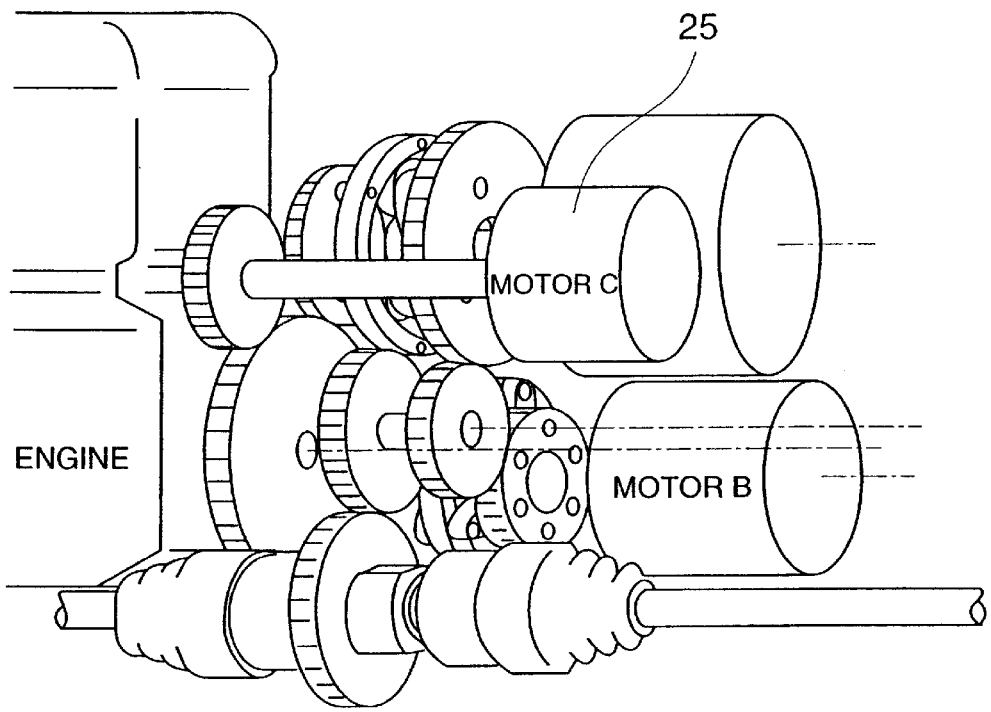
FIG. 7 is a view showing an embodiment of a vehicle using three motors in accordance with the present invention.
Figure 8:
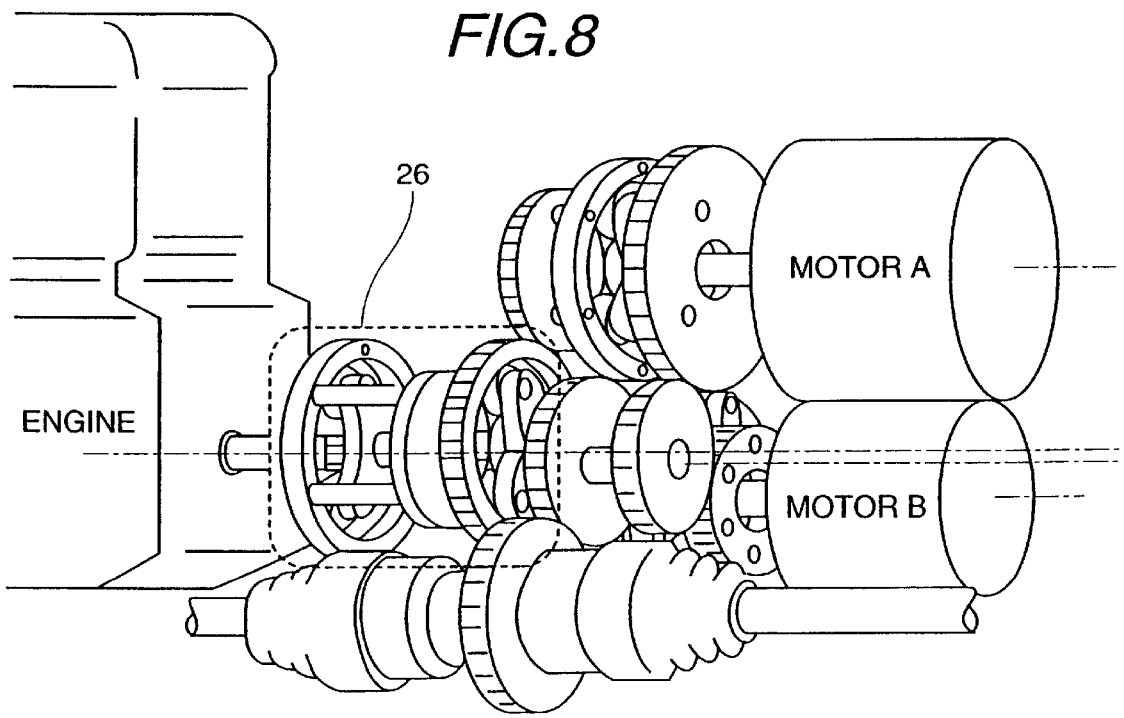
FIG. 8 is a view showing an embodiment of a vehicle using four planet gears in accordance with the present invention.

Although the construction having two planet gears and two motors has been described here, it is possible to construct a system without changing the purpose of the present invention even if number of planet gears and motors is increased. For example, FIG. 7 shows a construction having three motors and two planet gears by adding a small starter motor C 25 to the system of FIG. 1. Further, FIG. 8 shows a construction having two motors and four planet gears by adding a planet gear type transmission 26 to the engine output axis. By the present invention, a small sized and high productive system can be construct in each of the both cases.

Figure 9:
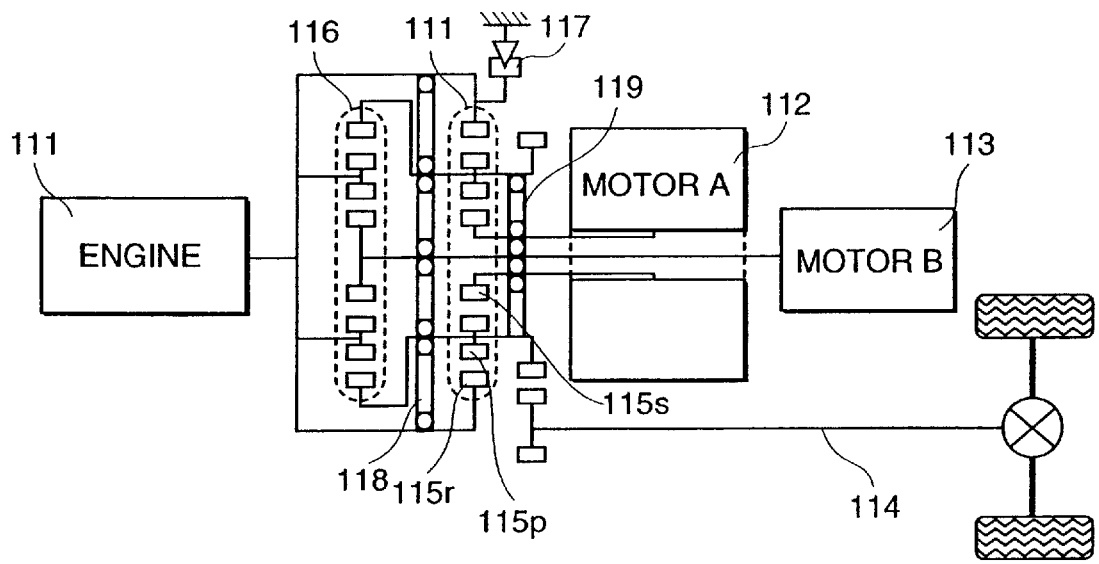
FIG. 9 is a view showing an embodiment of a vehicle in accordance with the present invention.

FIG. 9 shows an embodiment of a vehicle mounting the driving system in accordance with the present invention. The engine 111 generates a force driving the vehicle. The motor A 112 and the motor B 113 receive electric energy to release kinetic energy, and receive kinetic energy to convert to electric energy. The driving force of the engine 111 is controlled by the motor A 112 and the motor B 113 to be transmitted to the vehicle driving axis 114.

By arranging the planet gears 116 and 117, the motor A 112 and the motor B 113 in series, the driving system is narrowed in the width direction to form in a slender shape which resembles a transmission gear space of a vehicle of a vertical mounting engine and rear wheel drive type.

The planet gear 115 or 116 is a planet gear composed of a sun gear 115*s*, a planetary gear 115*p*, and a ring gear 115*r* in order from the center to the periphery.

In the planet gear 115, an output axis joint portion of the motor A 112 is connected to the sun gear 115*s*, a vehicle driving axis 114 is connected to the planetary gear 115*p*, and an output axis of the engine 111 is connected to the ring gear 115*r*.

In the planet gear 116, an output axis of the motor B 113 is connected to the sun gear 116*s*, the output axis 111 is connected to the planetary gear 116*p*, and the vehicle driving axis 114 is connected to the ring gear 116*r*.

The ring gear 115*r* of the planet gear 115 and the planetary gear 116*p* of the planet gear 116 are connected to a common axis which is connected to the engine output axis. The planetary gear 115*p* of the planet gear 115 and the ring gear 116*r* of the planet gear 116 are connected to a common axis which is connected to the vehicle driving axis. By using an output axis of the planet gear in common, the mechanism can be simplified and transmission loss can be reduced.

A one-way clutch 117 is disposed in the common axis of the ring gear 115*r* of the planet gear 115 and the planetary gear 116*p* of the planet gear 116 to prevent the engine from rotating in reverse direction.

Since bearings 118 and 119 bear all the axes in the contact surfaces, the thrust forces are canceled and the low loss and high efficiency bearing is possible.

Since the planet gear 116 is covered with the planet gear 115 and the engine output axis, gear noise of the planet gear 116 is hardly leaked out to the external to improve quietness of the system.

Figure 10:
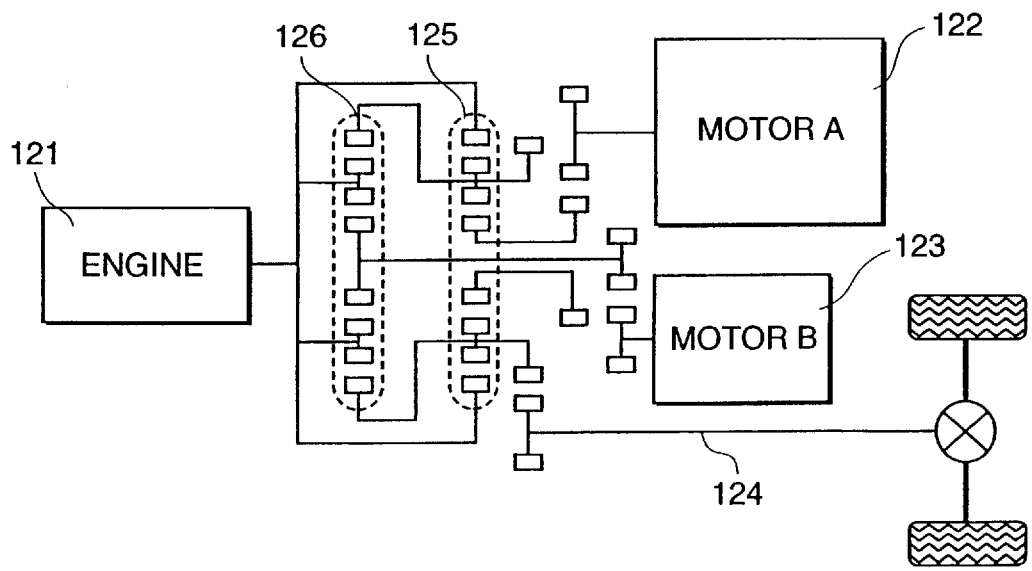
FIG. 10 is a view showing an embodiment of a vehicle in accordance with the present invention.

FIG. 10 shows an embodiment of a vehicle mounting the driving system in accordance with the present invention. The driving force of the engine 121 is controlled by the motor A 122 and the motor B 123 to be transmitted to the vehicle driving axis 124.

By arranging the motor A 122 and the motor B 123 in parallel, the length of the system can be shortened. Further, since gears are provided in the output axes of the motor A 122 and the motor B 123, freedom of motor design is increased.

Figure 11:
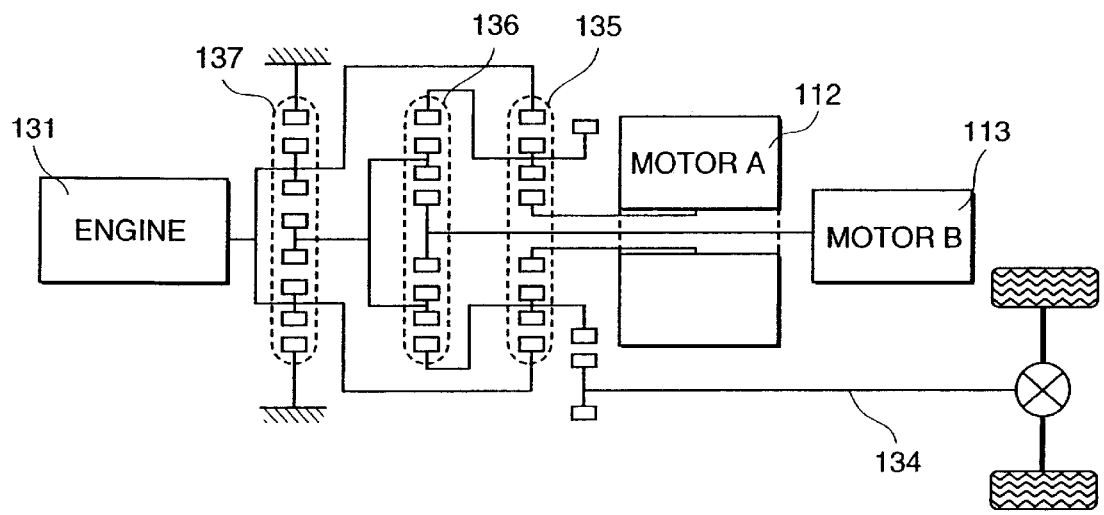
FIG. 11 is a view showing an embodiment of a vehicle in accordance with the present invention.

FIG. 11 shows an embodiment of a vehicle mounting the driving system in accordance with the present invention. The driving force of the engine 131 is controlled by the motor A 112 and the motor B 113 to be transmitted to the vehicle driving axis 134.

Since a planet gear 137 fixes the ring gear 137*r* to serves as a mechanical transmission gear. The rotating speed of the engine is amplified by the planet gear 137 and transmitted to the planetary gear 136*p* of the planet gear 136.

By providing the planet gear 137, it is possible to give freedom to design of the gear-shift range of a planet gear of which gear-shift ratio is limited by the mechanism.

Figure 12:
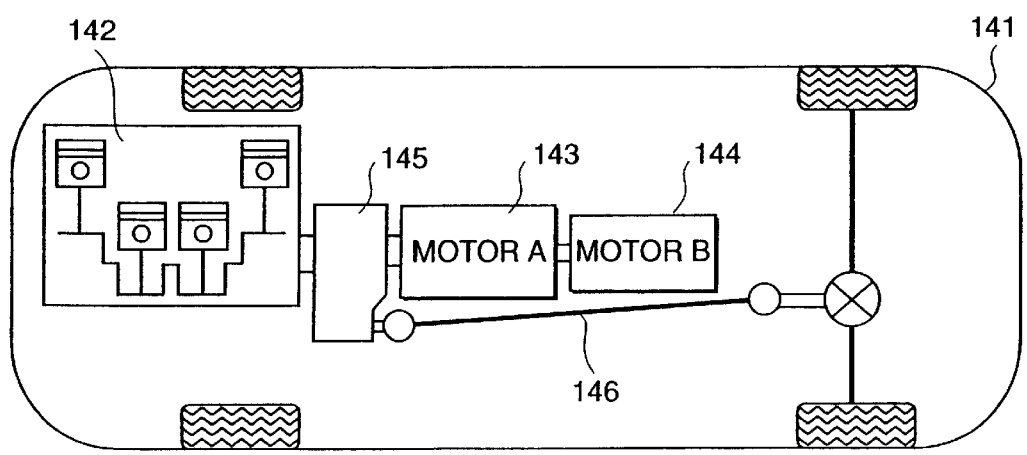
FIG. 12 is a view showing an embodiment of a vehicle in accordance with the present invention.

FIG. 12 shows an embodiment of a vehicle mounting the driving system in accordance with the present invention. The vehicle 141 is driven by controlling the driving force of the engine 142 using the motor A 143 and the motor B 144.

The gear box 145 is composed of the planet gears described above arranged on a single axis in series. By disposing the gear box 145 between the motor A 143 and a universal joint 146 of vehicle driving axis, the motor A 143 can be made small in size.

The arranging type of the engine 142 is called as a longitudinal type because the crank shaft is placed longitudinally to the running direction of the vehicle.

By narrowing the width of the system by arranging the engine 142, the motor A 143, the motor B 144 and the gear box 145 in series, the size of the system can be made so small as to be installed in a transmission gear space of an existing FR (front engine and rear drive) vehicle. Further, since the motors can be placed in a lower position, the moving performance of the vehicle can not be deteriorated. Furthermore, since the weight distribution of the vehicle is improved and the center of gravity is brought to the central position of the vehicle compared to an existing vehicle by arranging the motors in series, the moving performance of the vehicle can be improved.

Figure 13:
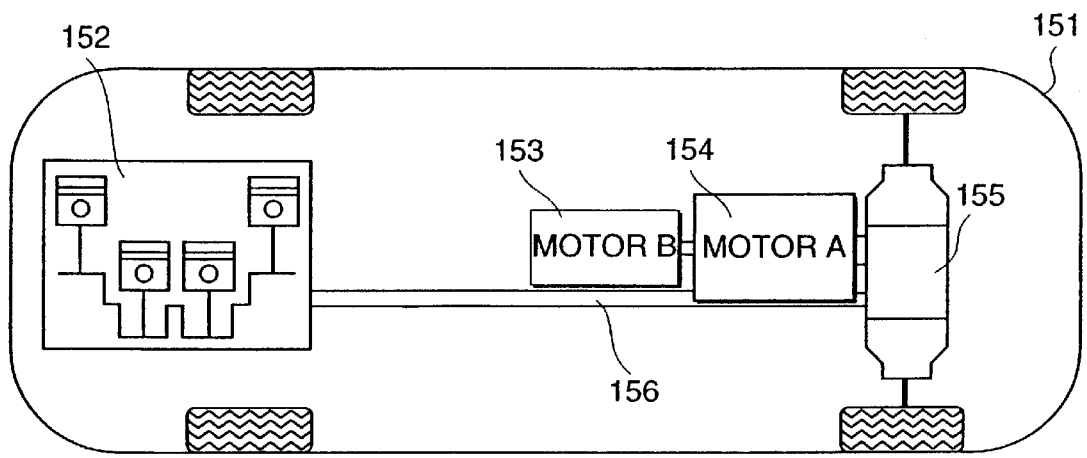
FIG. 13 is a view showing an embodiment of a vehicle in accordance with the present invention.

FIG. 13 shows an embodiment of a vehicle mounting the driving system in accordance with the present invention. The vehicle 151 is driven by controlling the driving force of the engine 152 using the motor A 153 and the motor B 154.

The gear box 155 is composed of the planet gears described above arranged on a single axis in series.

The driving force of the engine 152 is transmitted to a gear box 155 by a drive shaft 156.

By installing the motor A 153 and the motor B 154 at a position near the driving shaft of the rear wheels and forming them as a trans-axle, the moving performance of the vehicle can be improved. Further, since the motors are placed away from the engine and accordingly the motors are not affected by exhaust heat of the engine, it is easy to control temperature of the motors and to operate the motor at a high efficiency.

Figure 14:
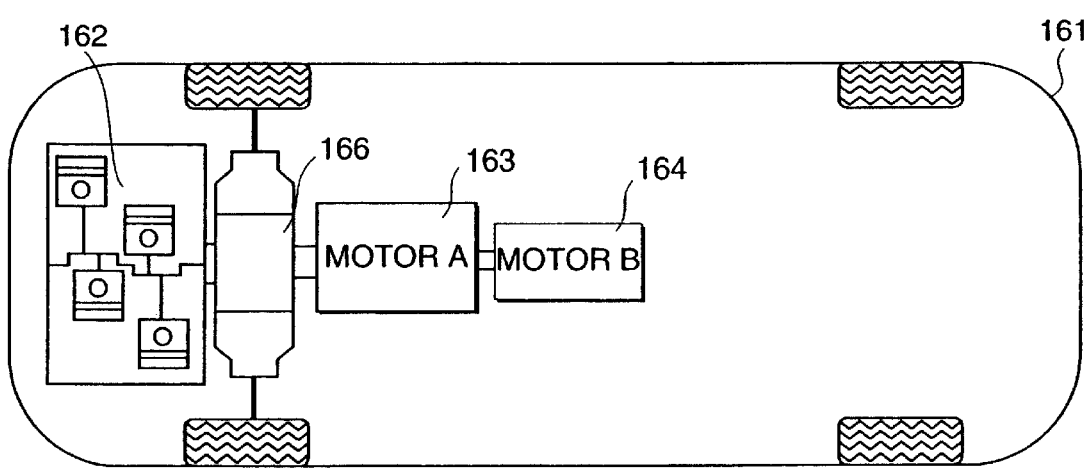
FIG. 14 is a view showing an embodiment of a vehicle in accordance with the present invention.

FIG. 14 shows an embodiment of a vehicle mounting the driving system in accordance with the present invention. The vehicle 161 is driven by controlling the driving force of the engine 162 using the motor A 163 and the motor B 164.

The gear box 165 is composed of the planet gears described above arranged on a single axis in series.

By narrowing the width of the system by arranging the motor A 163 and the motor B 164 in series, the system can be installed in an existing FF (front engine and front drive) vehicle of longitudinally mounting engine or an existing RR (rear engine and rear drive) vehicle of longitudinally mounting engine.

Similarly, there is no need to say that the present invention can be applied to a 4WD vehicle of longitudinally mounting engine.

Figure 15:
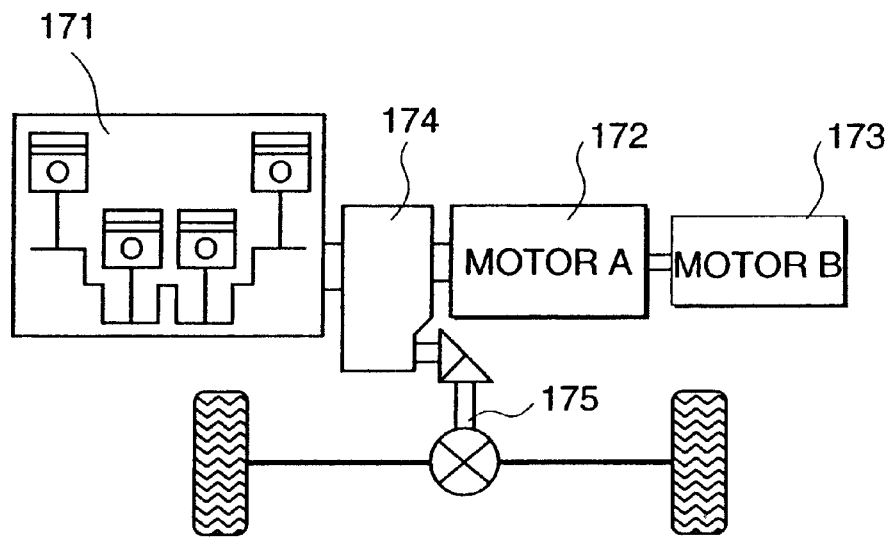
FIG. 15 is a view showing an embodiment of a vehicle in accordance with the present invention.

FIG. 15 shows an embodiment of a vehicle mounting the driving system in accordance with the present invention. The power of the engine 171 is controlled by the motor A 172 and the motor B 173, and transmitted to the vehicle driving axis 175. The arranging type of the engine 142 is called as a transverse type because the crank shaft is placed transversely to the running direction of the vehicle. By arranging the engine 171, the motor A 172, the motor B 173 and the gear box 174 in series, the length of the driving system in the longitudinal direction of the vehicle can be suppressed.

Figure 16:
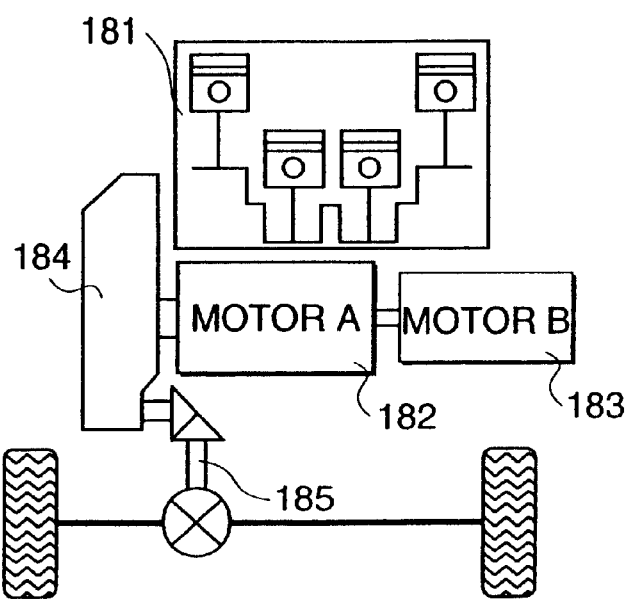
FIG. 16 is a view showing an embodiment of a vehicle in accordance with the present invention.

FIG. 16 shows an embodiment of a vehicle mounting the driving system in accordance with the present invention. The power of the transversely mounted engine 181 is controlled by the motor A 182 and the motor B 183, and transmitted to the vehicle driving axis 185. By arranging the engine 181, and the motor A 182 and the motor B 183 in parallel, the length of the driving system in the longitudinal direction of the vehicle can be suppressed.

In regard to the coaxial differential mechanism of one of the components of the present invention, examples of using the planet gear have been described in the above embodiments. However, the coaxial differential mechanism is not limited to the planet gear, but can be realized by a differential gear. Further, the mechanisms shown in FIG. 17 and FIG. 18 may be also used.

In general, by using a suffix c for a carrier axis, and suffixes s and r for remaining axes in a planet gear and a differential gear, a relational expression of speeds ($\omega$) among the axes can be expressed as follows.

$$\omega c = \alpha \cdot \omega s + (1-\alpha) \cdot \omega r \quad \text{(Equation 4)}$$

Therein, α is a constant determined by a ratio of numbers of gear teeth, and 0<α<1.

Figure 17:
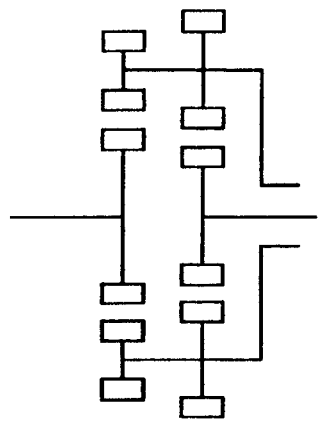
FIG. 17 is a vie showing an embodiment of a differential mechanism composed of a differential gear and a planet gear.
Figure 18:
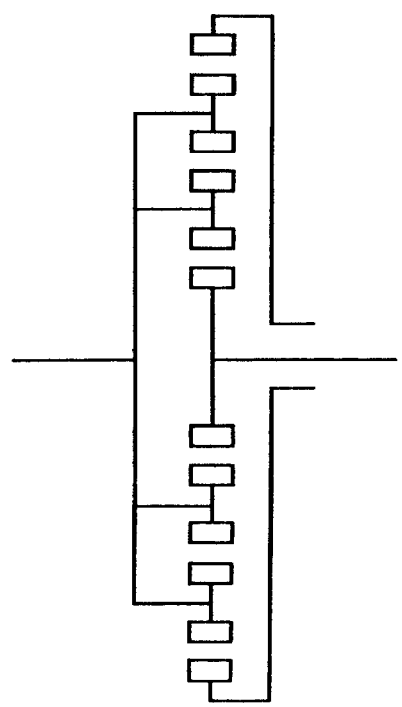
FIG. 18 is a vie showing an embodiment of a differential mechanism composed of a differential gear and a planet gear.

On the other hand, in the mechanisms shown in FIG. 17 and FIG. 18, a relational expression of speeds among the axes can be expressed as follows.

$$\omega c = -\beta \cdot \omega s + (1+\beta) \cdot \omega r \quad \text{(Equation 5)}$$

Therein, β is a constant determined by a ratio of numbers of gear teeth, and 0<β<1. It is clear from Equation 4 and Equation 5 that the rotating speed of the carrier axis can be expressed by weighted addition and subtraction of rotating speeds of the remaining two axes, and it can be understood that Equation 4 and Equation are mathematically equivalent. Therefore, any one of the planet gear, the differential gear, the mechanism shown in FIG. 17 and the mechanism shown in FIG. 18 may be used for the component of the present invention.

Figure 19:
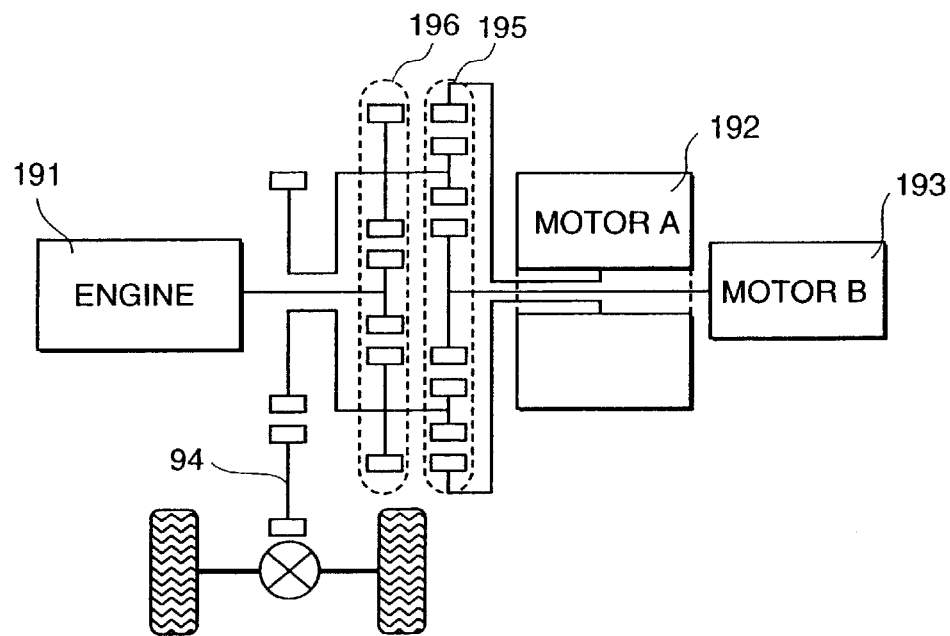
FIG. 19 is a view showing an embodiment of a vehicle in accordance with the present invention.

FIG. 19 shows an embodiment of a vehicle mounting the driving system in accordance with the present invention. The power of the transversely mounted engine 191 is controlled by the motor A 192 and the motor B 193, and transmitted to the vehicle driving axis 194.

By using a Labinio type planet gear composed of a differential gear 196 and a planet gear 195, number of gear parts can be reduced.

Figure 20:
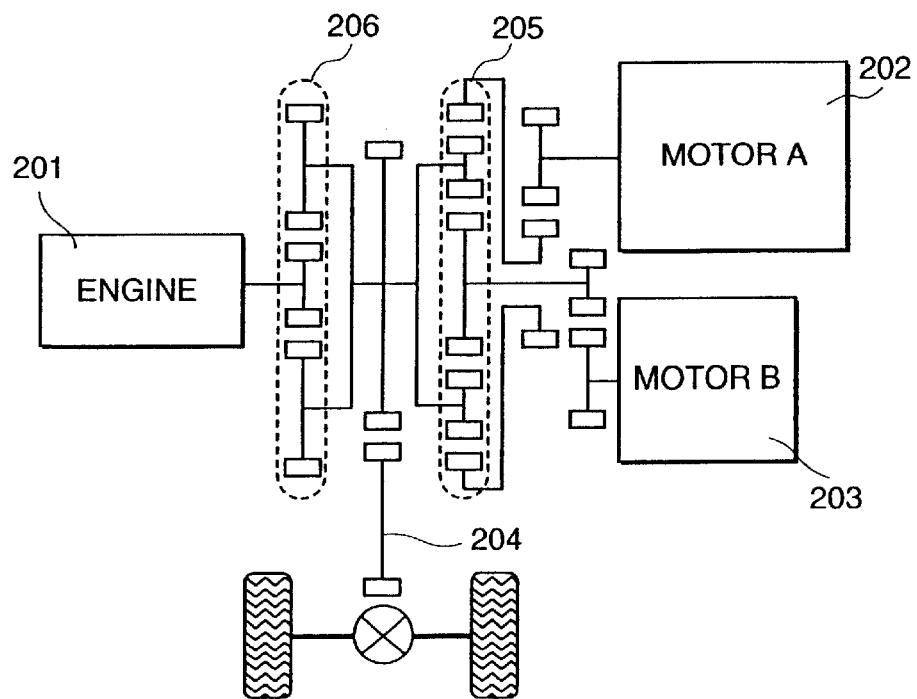
FIG. 20 is a view showing an embodiment of a vehicle in accordance with the present invention.

FIG. 20 shows an embodiment of a vehicle mounting the driving system in accordance with the present invention. The power of the transversely mounted engine 201 is controlled by the motor A 202 and the motor B 203, and transmitted to the vehicle driving axis 204.

By using a Labinio type planet gear composed of a differential gear 206 and a planet gear 205, freedom of arranging the output axes is increased, and the ability of mounting on a vehicle can be improved.

Figure 21:
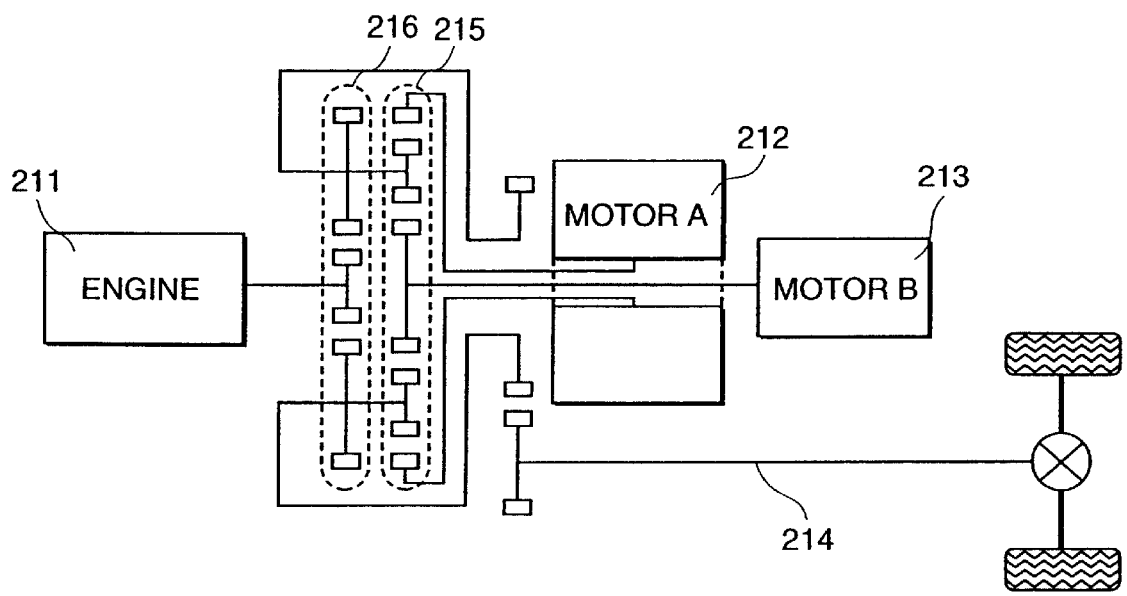
FIG. 21 is a view showing an embodiment of a vehicle in accordance with the present invention.

FIG. 21 shows an embodiment of a vehicle mounting the driving system in accordance with the present invention. The power of the transversely mounted engine 211 is controlled by the motor A 212 and the motor B 213, and transmitted to the vehicle driving axis 214.

Since the differential gear 216 covers the planet gear 215, gear noise can be suppressed. Further, since the motors are arranged in series, the width of the driving system can be suppressed and accordingly the driving system is suitable for longitudinally mounted engine.

INDUSTRIAL AVAILABILITY OF THE INVENTION

According to the present invention, in an engine-electric hybrid vehicle having a motor-generator, a small sized and high productive driving system can be provided.

What is claimed is:

1. A driving system comprising:
   an engine;
   a plurality of motor-generators; and
   a plurality of planetary gear sets, wherein
   rotating output axes of said plurality of motor-generators are disposed parallel to and opposite to a rotating output axis of said engine,
   a distance Lf1 projected in an axial direction between an end in a side of the rotating output axis of a first motor-generator having the largest dimension in a direction of the rotating output axis among said plurality of motor-generators and an end in a side of the rotating axis of the engine is equal to or smaller than a distance Lfi (i=2, 3, ...) projected in the axial direction between an end in a side of the rotating output axis of each of the other motor-generators excluding the first motor-generator and the end in the side of the rotating axis of the engine, and
   a distance Le1 projected in an axial direction between an end in an opposite side of the rotating output axis of a first motor-generator having the largest dimension in a direction of the rotating output axis among said plurality of motor-generators and an end in a side of the rotating axis of the engine is equal to or larger than a distance Lei (i=2, 3, ...) projected in the axial direction between an end in an opposite side of the rotating output axis of each of the other motor-generators excluding the first motor-generator and the end in the side of the rotating axis of the engine.

2. A driving system comprising:
   an engine;
   a plurality of motor-generators; and
   a plurality of planetary gear sets, wherein
   rotating output axes of said plurality of motor-generators are disposed parallel to a rotating output axis of said engine and in a side of a surface distant from said engine,
   a distance Lf1 projected in an axial direction between an end in a side of the rotating output axis of a first motor-generator having the largest dimension in a direction of the rotating output axis among said plurality of motor-generators and an end in a side of the rotating axis of the engine is equal to or smaller than a distance Lfi (i=2, 3, ...) projected in the axial direction between an end in a side of the rotating output axis of each of the other motor-generators excluding a first motor-generator and the end in the side of the rotating axis of the engine, and
   a distance Le1 projected in an axial direction between an end in an opposite side of the rotating output axis of a first motor-generator having the largest dimension in a direction of the rotating output axis among said plurality of motor-generators and an end in a side of the rotating axis of the engine is equal to or larger than a distance Lei (i=2, 3, ...) projected in the axial direction between an end in an opposite side of the rotating output axis of each of the other motor-generators excluding the first motor-generator and the end in the side of the rotating axis of the engine.

3. A driving system according to claim 1 or claim 2, wherein
   a center of gravity of said motor-generator having the maximum weight is placed at a position lower than a center of gravity of each of said other motor-generators.

4. A driving system according to claim 1 or claim 2, wherein
   a lowermost end of said motor-generator having the maximum volume is placed at a position higher than a center of gravity of each of said other motor-generators.

5. A driving system comprising:
   an engine;
   a plurality of motor-generators; and
   a plurality of planetary gear sets, wherein said planetary gear sets are disposed so that straight lines passing through rotating axes of at least two of said coaxial differential mechanisms are parallel to each other, which satisfies the following relationship, $$L < D1 + D2 + \ldots Dn,$$

where a shape formed by projecting said motor-generators on a plane having a normal direction parallel to the axes of said motor-generators is let be F, and an arbitrary rectangle including said shape F is let to be R, a long side of said rectangle is let be L, and diameters of said motor-generators are let be D1, D2, . . . , Dn.

6. A driving system according to claim 5, wherein said engine and each said motor-generator are disposed at symmetric positions with respect to each said planetary gear set.

7. A driving system according to claim 5, further comprising a plurality of differential geared motor-generators, each of which is formed by connecting a rotating axis of said motor-generator to the rotating axis of each of said planetary gear set, wherein at least a pair of straight lines among straight lines passing through rotating axes of said plurality of differential geared motor-generators are disposed parallel to each other.

8. A driving system according to claim 7, further comprising a transmission axis for transmitting torque to wheels, wherein said plurality of planetary gear sets are attached so that a rotating axis of said engine and said transmission axis can mechanically transmit torque, and a straight line passing through the rotating axis of said engine and a straight line passing through said transmission axis are disposed with an offset and parallel to each other.

9. A driving system according to claim 7, further comprising two motor-generators, wherein individual rotating output axes of said two motor-generators are disposed antipode with respect to a plane containing a straight line passing through the rotating output axis of said engine and a straight line passing through a transmission axis for transmitting torque to wheels.

10. A driving system comprising:

an engine;

a plurality of coaxial differential mechanisms; and a first and a second motor-generators, wherein said plurality of coaxial differential mechanisms comprise a first coaxial differential mechanism connected to an output axis of said engine, an input and output axis of said first motor-generator and a vehicle driving axis; and a second coaxial differential mechanism connected to the output axis of said engine, an input and output axis of said second motor-generator and a vehicle driving axis, said first motor-generator and said second motor-generator being disposed on a single axis, an axis of said first differential mechanism connected to said input and output axis of said first motor-generator penetrating through an axis of said second differential mechanism connected to said input and output axis of said second motor-generator.

11. A driving system according to claim 10, wherein at least one of input and output axes composing said first differential mechanism is connected to an input and output axis of said second coaxial differential mechanism.

12. A vehicle comprising any one of the driving systems according to any one of claims 1, 2, 5 and 10.

* * * * *